United States Patent [19]

Hale et al.

[11] Patent Number: 5,199,248
[45] Date of Patent: Apr. 6, 1993

[54] GRAIN LOSS MONITOR

[75] Inventors: Oliver D. Hale, Haynes; Robert N. Hobson, Cople; Vien N. Nguyen, Hockley, all of England

[73] Assignee: National Research Development Corporation, London, England

[21] Appl. No.: 689,759
[22] PCT Filed: Sep. 21, 1990
[86] PCT No.: PCT/GB90/01458
§ 371 Date: Jun. 26, 1991
§ 102(e) Date: Jun. 26, 1991
[87] PCT Pub. No.: WO91/03928
PCT Pub. Date: Apr. 4, 1991

[30] Foreign Application Priority Data
Sep. 21, 1989 [GB] United Kingdom ............. 8921404

[51] Int. Cl.⁵ ............................................. A01D 41/06
[52] U.S. Cl. ............................................ 56/102; 56/DIG. 15
[58] Field of Search ................... 56/10.2, 11.9, 208, 56/DIG. 15

[56] References Cited

U.S. PATENT DOCUMENTS

| | | |
|---|---|---|
| 3,442,068 | 5/1969 | Bulin . |
| 3,906,710 | 9/1975 | Pask ............................ 56/10.2 |
| 4,171,606 | 10/1979 | Ziegler et al. .................. 56/10.2 |
| 4,197,694 | 4/1980 | Hagie et al. ................... 56/10.2 |
| 4,437,295 | 3/1984 | Rock ............................. 56/10.2 |
| 4,507,910 | 4/1985 | Thornley et al. ............... 56/10.2 |
| 4,788,813 | 12/1988 | Strosser et al. ................ 56/10.2 |

FOREIGN PATENT DOCUMENTS 152291 8/1985 European Pat. Off. .
2219482 12/1985 United Kingdom .

OTHER PUBLICATIONS

WO, A, 8601972 (National Research Development Corporation) Apr. 10, 1986 see p. 62, line 19-p. 63, line 7; claims 1-3.

Primary Examiner—George A. Suchfield
Attorney, Agent, or Firm—Cushman, Darby & Cushman

[57] ABSTRACT

An apparatus for harvesting crop parts from a standing crop and leaving stripped stems in the field has a crop stripping rotor under a hood. Grain strikes the underside of the hood, and four or more piezoelectric impact detectors detect the pattern of grain strike density on the hood. Front end grain losses are found, based on the pattern of grain strikes on the underside of the hood. The hood position is adjusted by a ram in response to data measured by the detectors.

33 Claims, 12 Drawing Sheets

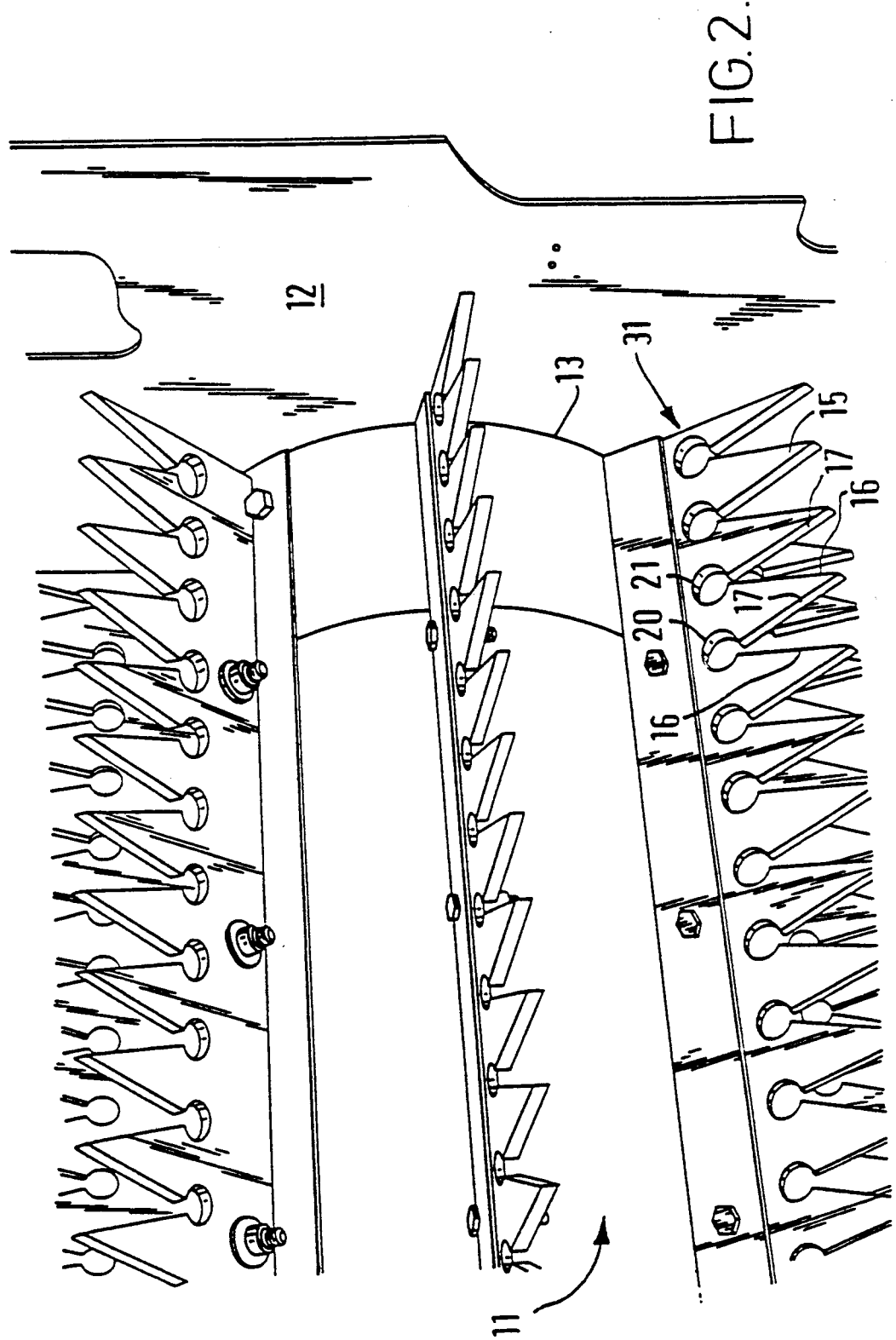

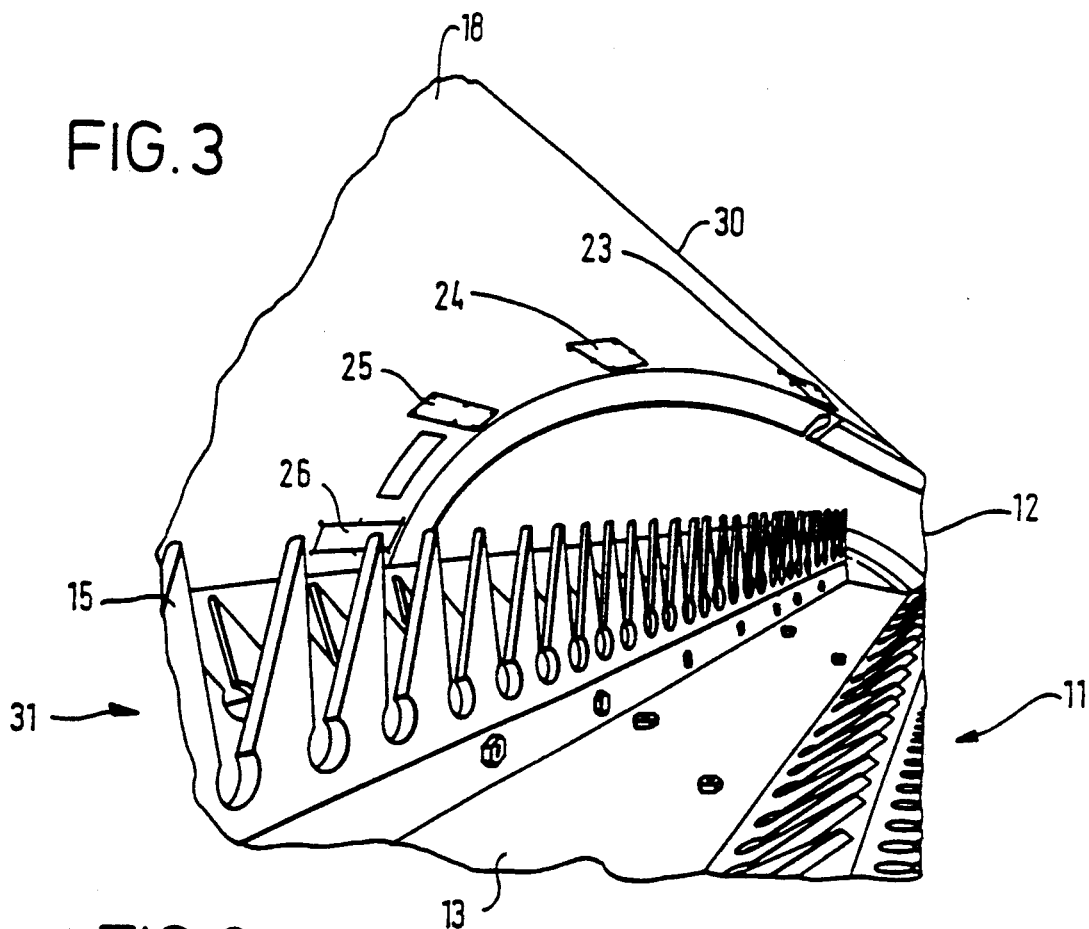
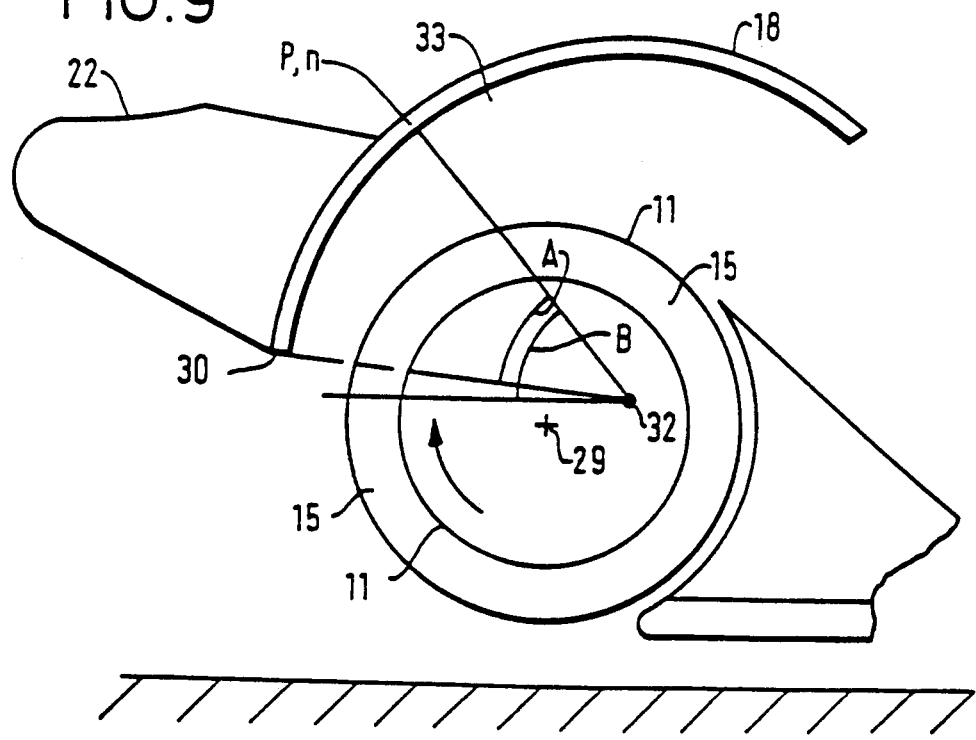

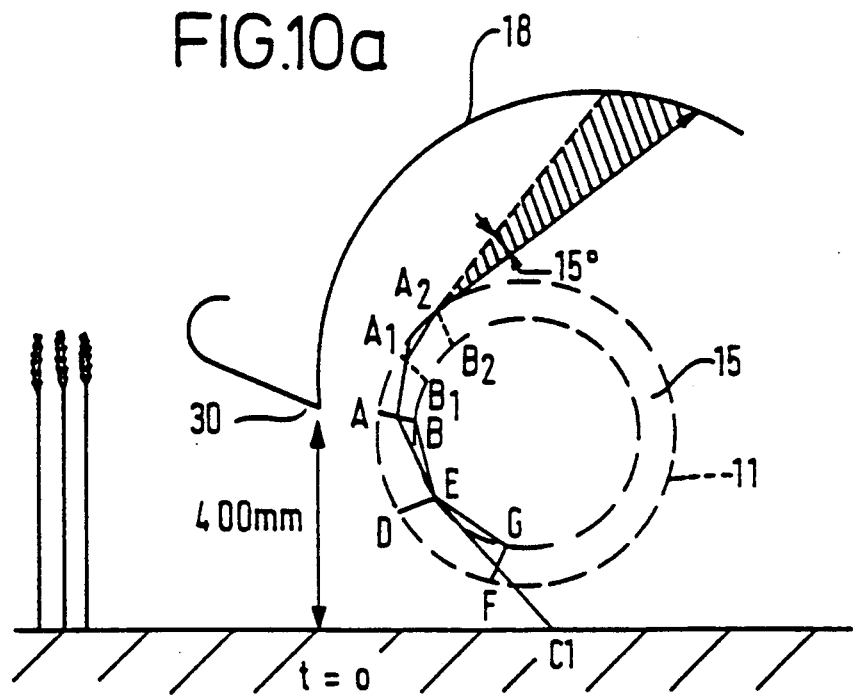
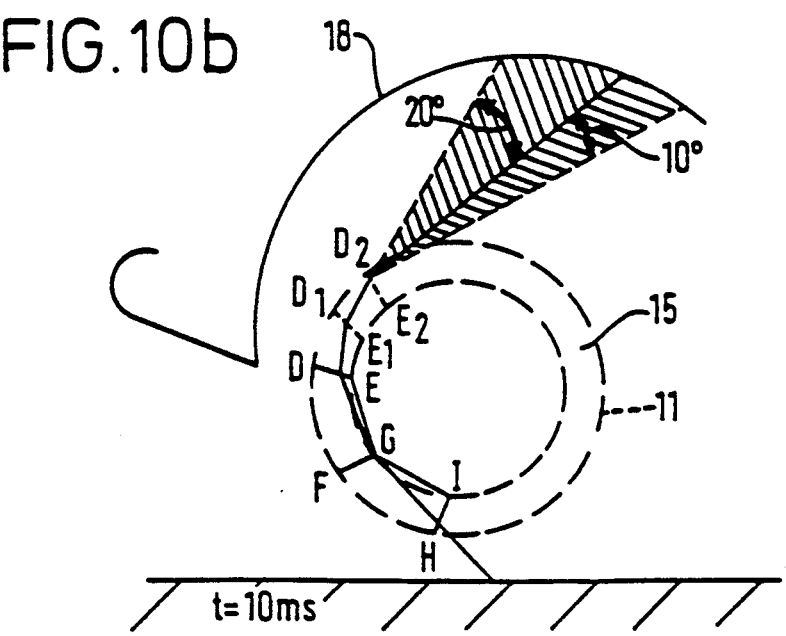

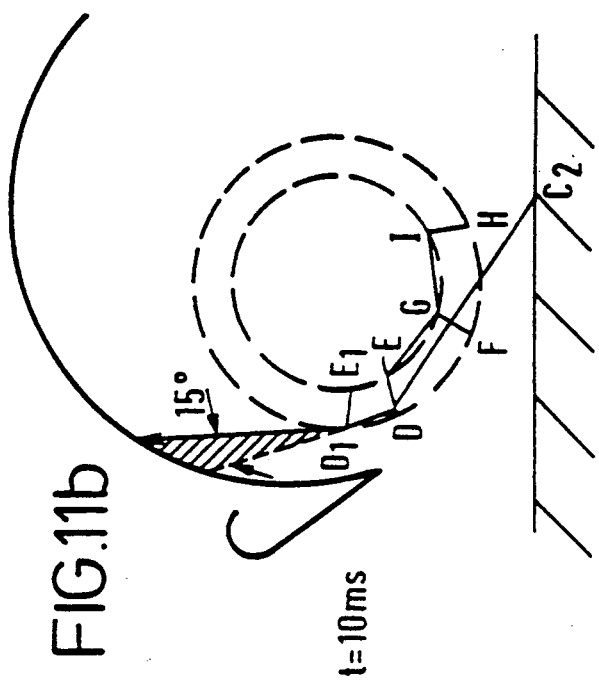
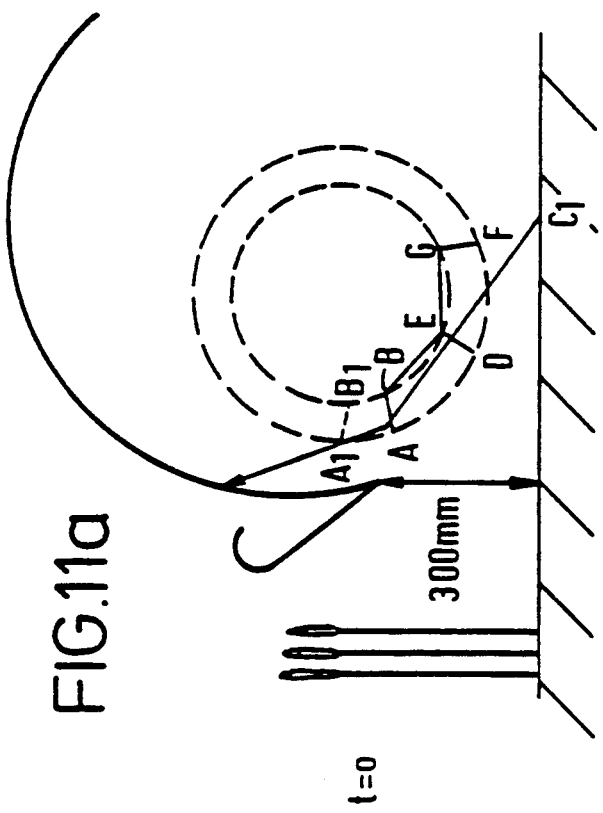

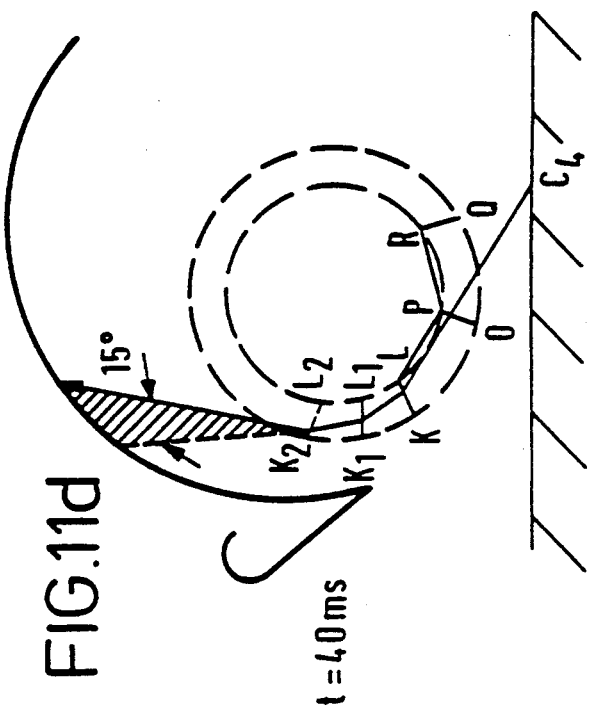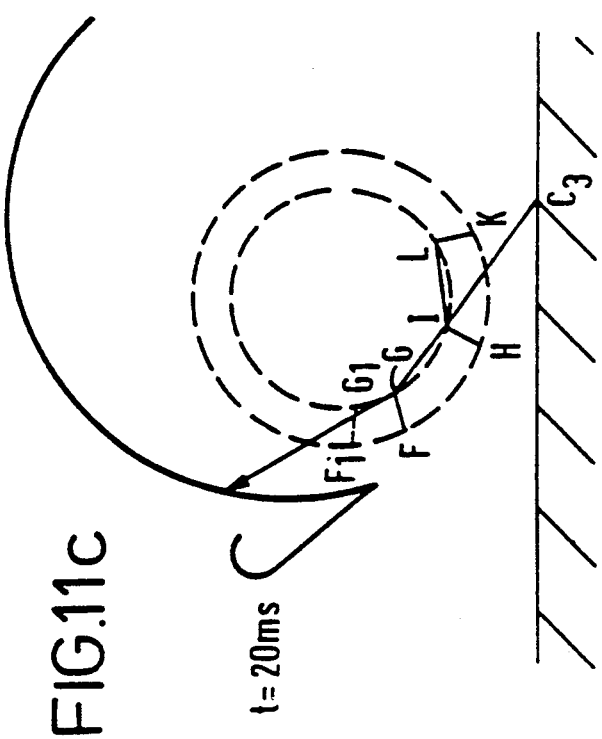

GRAIN LOSS MONITOR

The present invention relates to an apparatus for, and methods of, harvesting crops.

The invention is concerned with a harvesting apparatus for detaching grain, or other required portions of a crop, from a standing crop, to leave the remaining stripped parts of the crop standing in the field. The invention has particular application in the harvesting of grain crops, such as wheat, oats, barley and rice.

There have been proposed previously a large number of different forms of apparatus for stripping crops in this way, and the present invention is particularly applicable in connection with the apparatus and method set out in our previous published patent applications, WO 86/01972 (NRDC) and GB-A-2188822 (NRDC). The apparatus described in these patent applications comprises a mobile frame for movement over the ground, and moveable support means (such as a rotor or conveyor belt) driven relative to the frame and carrying a plurality of outwardly projecting crop engaging elements for stripping the required crop parts. In preferred forms, the crop engaging elements are formed by transverse ribs which are shaped to provide outwardly extending, triangular crop stripping teeth. The elements are driven so as to move upwardly and rearwardly at a front region of the apparatus, for example where the elements are mounted on a rotor, the rotor is rotated in the so called overshot mode so that the elements move upwardly and rearwardly over the rotor as it rotates. The crop engaging elements are arranged to engage the standing crop while projecting forwardly relative to the direction of forward travel of the apparatus.

It has been found that, in the case of a grain crop, the mixture leaving the stripping means includes a substantial proportion of free grain, which has in effect been threshed by the action of the stripping means. The detached material also includes whole and part heads of grain, and some material other than grain (MOG) such as straw and flag leaves. It is a drawback of such an apparatus that some of the stripped crop, particularly free grain, is lost at the front end of the apparatus. The losses arise either by stripped grain being driven forwardly under the edge of the overhead hood, at the inlet to the crop flow passage, or by otherwise returning to the ground.

It is one object of the invention to provide means for monitoring, controlling, and reducing front end losses of detached grain and grain heads and part heads from crop stripping apparatus of the kind disclosed in our previous patent applications described above. However, it will be appreciated that the present invention has application in many other forms of crop stripping devices and is applicable to monitor, control and improve other characteristics of crop stripping in addition to front end losses.

According to the present invention there is provided apparatus for harvesting required crop parts from standing crops comprising crop stripping means for stripping from a standing crop required parts of the crop, guide means cooperating with the crop stripping means to form a crop flow passage for detached crop parts, detector means positioned in the region of the crop flow passage for monitoring a characteristic of the trajectory of detached crop parts along the passage, operating means for varying an operating parameter of the apparatus which influences the trajectory of detached crop parts along the passage in operation, and signal processing means for processing signals from the detector means, the signal processing means having an output connected to the operating means for effecting adjustment of the operating means in response to the output of the detector means, and/or the processing means having an output connected to a display means for displaying to an operator an indication of the said characteristic monitored by the detector means.

The term standing corp means a crop in the field before any harvesting operation has been carried out on it, for example before any cutting operation, and includes any crop which may be partly laid, leaning, or twisted, as well as upright crop.

In one particular form, the detector means comprises impact detector means for detecting impacts on the guide means by detached crop parts. Preferably, the detector means comprises a series of detectors positioned along the crop flow passage to monitor the distribution of the impacts of detached crop parts along the passage.

In one particular use of the invention, the detector means is arranged to monitor the density of impacts of crop parts at different locations along the crop flow passage, and preferably the signal processing means is arranged to compare a measure of the pattern of impact density along the passage with a measure of a predetermined desired pattern of impact density along the passage. In a preferred form, the said measure is a measure of the position along the crop flow passage of the center of distribution of impacts along the passage. This measure is a position calculated from the measured data and represents the peak of impact distribution, although it will not necessarily coincide with a position at which a maximum number of impacts is actually measured. Density of impacts means the number of impacts by crop parts per unit area along the crop flow passage.

The guide means may comprise a hood extending over at least part of the crop stripping means and the detector means may comprise impact detector means for detecting impacts by detached crop parts on the underside of the hood.

The crop stripping means may comprise a plurality of outwardly projecting crop stripping elements mounted on a moveable support means, and drive means for driving the moveable support means so as to move the crop stripping elements along a path which includes movement upwardly and rearwardly as the apparatus moves forwardly into the crop. The crop stripping means may include a rotor mounted for rotation about a substantially horizontal axis transverse to the direction of forward travel of the apparatus, the rotor being driven in operation in a sense such that at the bottom of the rotor, the periphery of the rotor moves in the same direction as the forward travel of the apparatus. In an alternative arrangement, the moveable support means may comprise a conveyor belt.

It has been found that in a grain stripping apparatus of the kind set out in our previous published patent application number WO 86/01972 (NRDC), front end grain losses depend upon a number of factors, but a main factor is the height of the hood inlet edge relative to crop height. Variation of the height of the hood causes the distribution of grain particles striking the underside of the hood to move. Best results are obtained when the majority of the grain which is stripped and impelled by the rotor strikes the underside of the hood at, or approximately at, the twelve o'clock position, or to the rear thereof. Twelve o'clock position means a position directly above the axis of rotation of the rotor.

In the application of the present invention to the case of a grain stripping rotor such as has been described, analysis of the outputs of a plurality of impact detectors along the crop flow path under the hood gives an indication of where the main concentration of particles striking the hood occurs. An operating parameter of the hood, such as the height of the front edge of the hood, can then be varied, either by the operator, or preferably automatically, so as to bring this concentration of grain strikes to the preferred location, for example approximately at or to the rear of the twelve o'clock position. However, it will be appreciated that the apparatus embodying the invention in a broad aspect can be used to provide a servo system for adjusting any other operating parameter which influences the position at which the grains mostly strike the underside of the hood. For example, the whole height of the header (the rotor and the hood) can be varied automatically, or the rotor speed or forward speed of the apparatus can also be varied to influence the desired crop pattern along the crop flow passage.

Thus, considering a broad aspect of the invention, the signal processing means may be arranged to compare data derived from the detector means with stored data representing a desired characteristic of the trajectory of detached crop parts along the passage. In a preferred form, the said desired characteristic is that the main concentration, or region of maximum density, of impacts by detached crop parts occurs on the underside of the hood at a predetermined region. Preferably, the said predetermined region is a region extending above or approximately above the axis of the rotor and to the rear thereof.

The signal processing means may be arranged to generate an output signal representing the difference between the monitored characteristic of the crop movement in the passage and the desired characteristic. The operating means may be controlled by the output of the signal processing means to bring the characteristic of the passage trajectory into closer correspondence with the desired characteristic.

In the particular example discussed above, in which grain is stripped by an overshot rotor under a hood, it may be arranged that the said desired characteristic is that the maximum density of impacts by detached crop parts occurs on the underside of the hood at a predetermined region. By way of example, the maximum grain strike position may be up to 25° in front of the twelve o'clock position, or generally to the rear thereof. In some arrangements the preferred maximum impact region is at a position of between 80° and 100° from the hood inlet edge.

The operating means may be arranged to raise or lower the front of the hood in response to the said output signal, for example the operating means may be arranged to raise or lower the front of the hood in response to detection of an increase in the proportion of impacts on the hood in the region of the inlet to the crop flow passage. Normally in practice the header losses increase if the hood inlet edge is too high or too low in relation to the crop height. The signal processing means may include logic circuitry enabling it to "seek" for the correct position, that is to say to try different heights empirically, and monitor the results to see if there is an improvement in the monitored characteristic.

For example the signal processing means may store data representing a desired profile of the grain strike density along the crop flow passage and may be arranged to compare the grain strike profile derived from the detector means with this predetermined desired profile. The processing means may then produce a servo control signal which actuates the operating means to vary the operating parameter appropriately to bring the actual grain strike profile into closer agreement with the stored, preferred grain strike profile.

The operating means may for example be arranged to pivot the hood about an axis parallel to and spaced from the axis of a rotor forming the crop stripping means, so as to move the edge of the hood at the inlet to the crop flow passage downwardly and towards the outer envelope of the tips of the elements or upwardly and away from the outer envelope of the tips of the rotor, depending upon the characteristic monitored by the detector means.

Features of the invention which have been set out in connection with apparatus according to the invention may also be provided in accordance with a method of the invention, and vice versa.

In particular, there maybe provided in accordance with the invention, a method of harvesting required crop parts from standing crop, comprising the steps of stripping required parts of the crop from standing crop, moving the detached crop parts along a crop flow passage, monitoring a characteristic of the trajectory of the detached crop parts along the passage, and varying an operating parameter of the apparatus in response to the monitored characteristic so as to bring the monitored characteristic more closely in correspondance with the predetermined desired characteristic.

Embodiments of the invention will now be described by way of example with reference to the accompanying drawings in which:

FIG. 2 is a front perspective view of a crop stripping rotor suitable for use in the apparatus of FIG. 1;

FIG. 3 is a perspective view of the underside of a hood extending over a crop stripping rotor in the apparatus of FIG. 1, the hood being raised out of the normal operating position in the view of FIG. 3;

Figure 1:
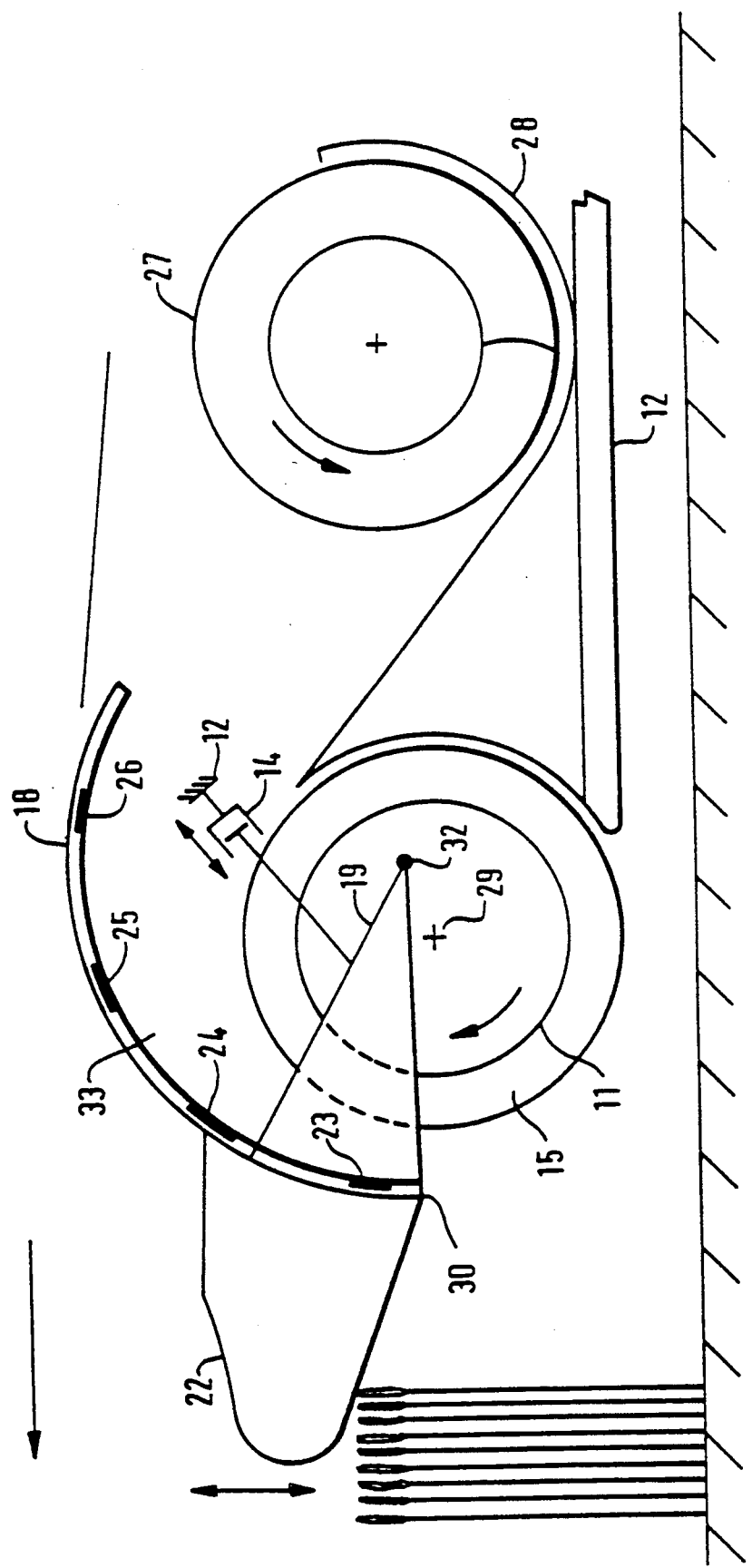
FIG. 1 is a diagrammatic cross section of a grain stripping apparatus embodying the invention.
Figure 5A:
Figure 6:
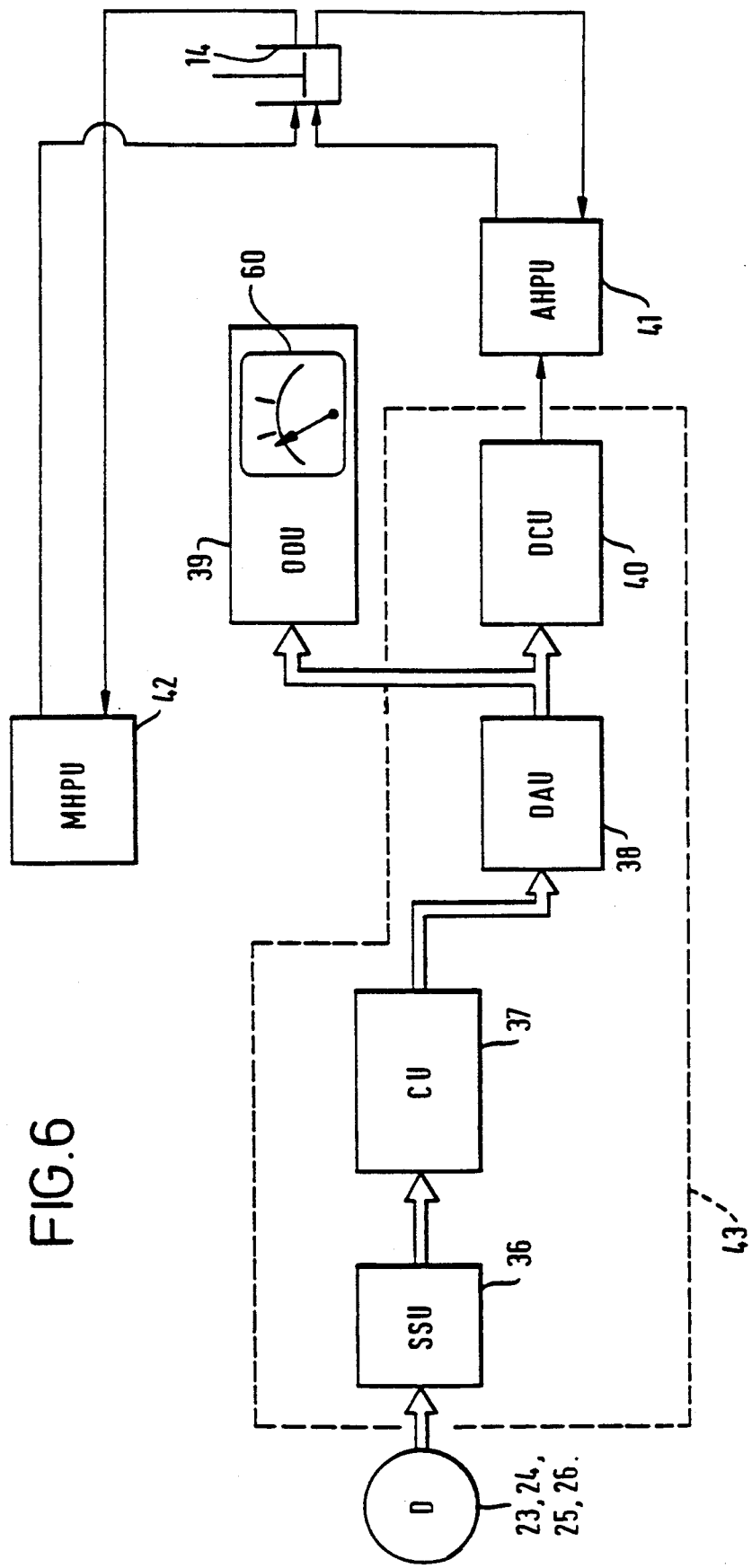
Figure 7:
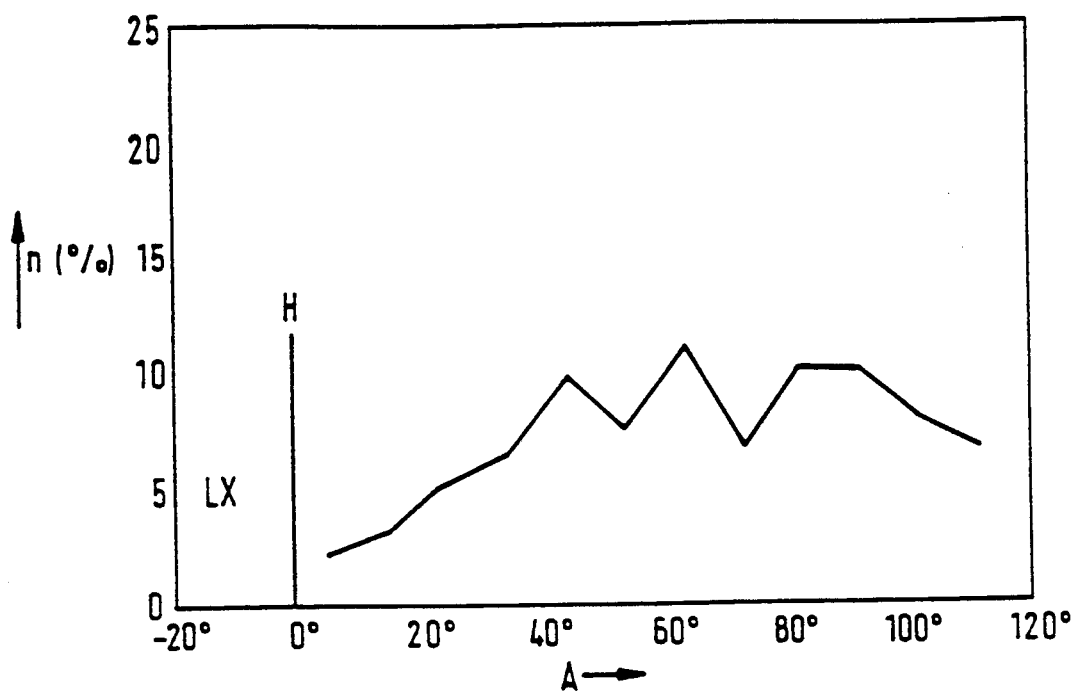
Figure 8:
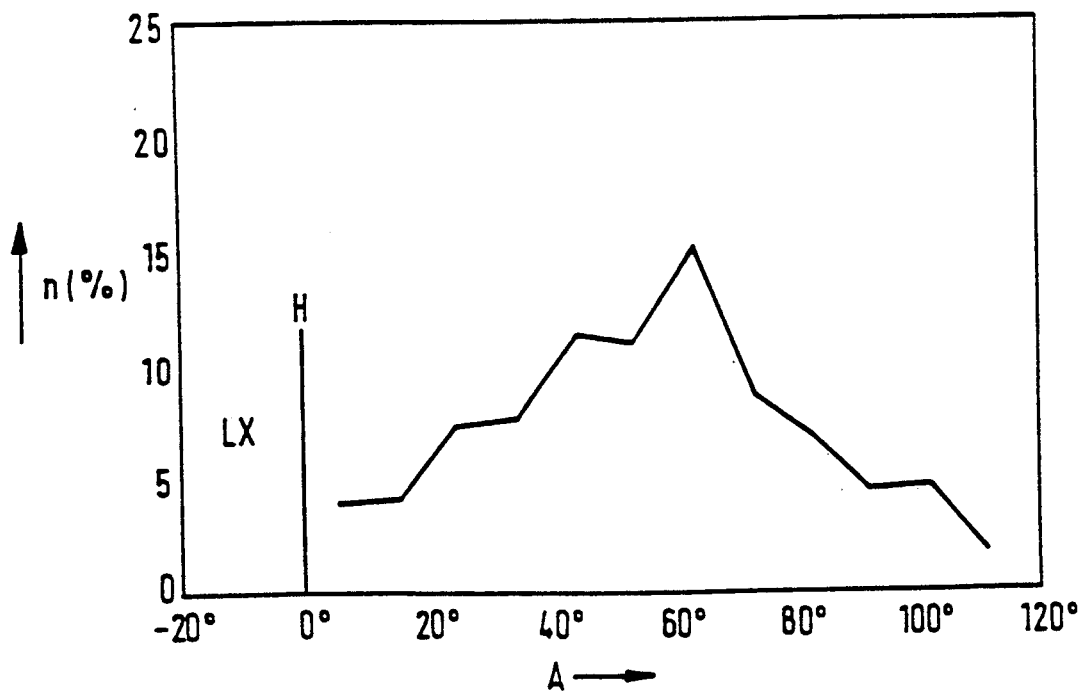
Figure 8A:
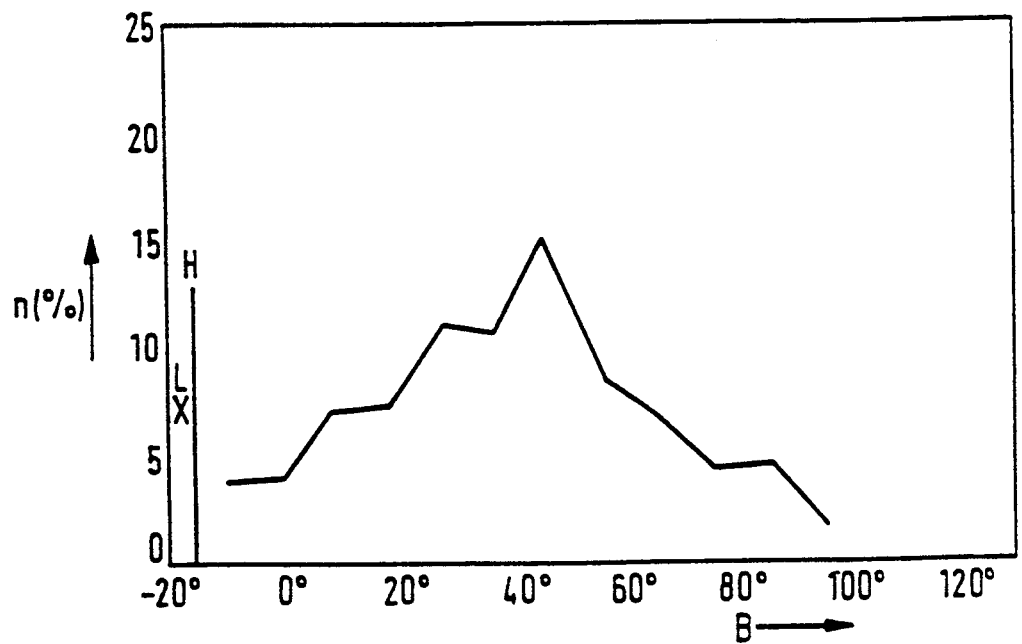

FIGS. 5a, b, c and d show output signals from impact detectors after various stages of filtering and shaping;

FIG. 6 is a block diagram of apparatus for adjusting an operating parameter of the harvesting apparatus of FIG. 1;

FIGS. 7, 8, 7a and 8a are graphs showing percentage grain distribution at different positions around the hood of the apparatus shown in FIG. 1;

FIG. 9 is a diagrammatic side view of the grain stripping rotor and hood of the apparatus of FIG. 1, showing angles referred to in the graphs of FIGS. 7 to 8a.

Figure 12:
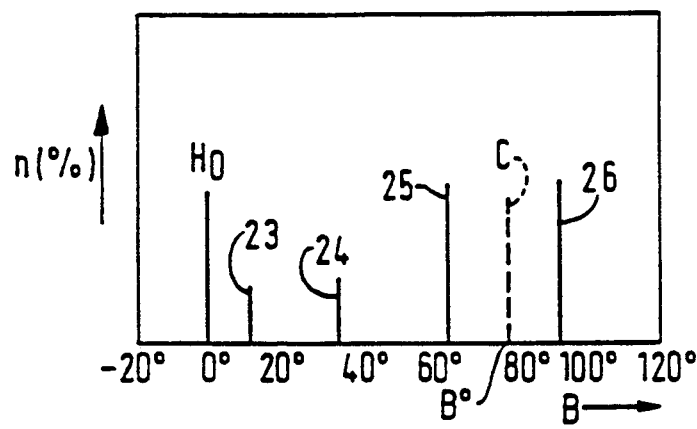
Figure 13:
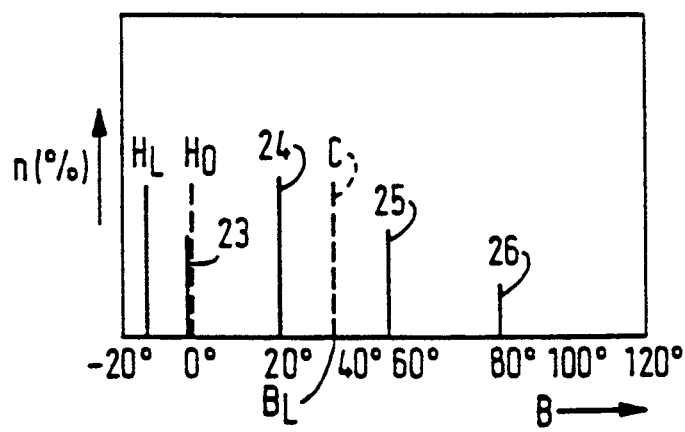
Figure 14:
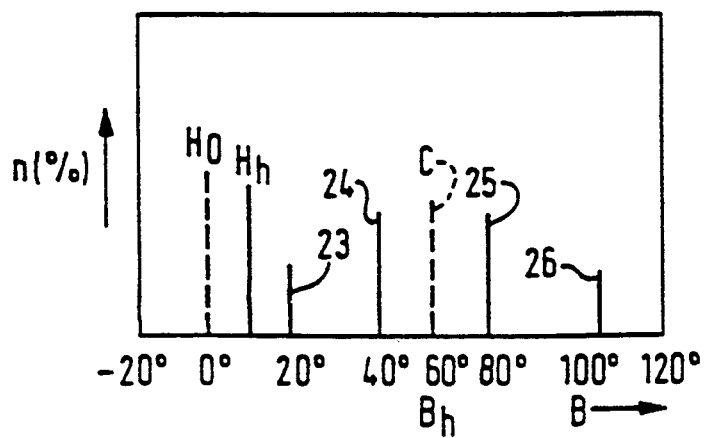

FIGS. 10a and 10b, and 11a to 11d, show diagrammatically an analysis of the grain stripping process at different hood heights; and FIGS. 12, 13 and 14 are graphs showing measurements of grain strikes at four detectors on the hood of the apparatus of FIG. 1, taken at different hood heights relative to the ground.

Referring to FIGS. 1, 2 and 3, the apparatus shown by way of example is a harvesting apparatus for stripping grain from a cereal crop. The apparatus comprises a mobile frame 12 on which is mounted a rotor 11, carrying outwardly projecting crop engaging elements 15. The rotor 11 is driven in the so-called overshot mode so that the crop engaging elements 15 are moved in an upward direction at the front of the apparatus. The rotor 11 rotates about an axis 29. A hood or cover 18 extends around part of the front half of the rotor and defines with the rotor elements 15 a crop flow passage 33 along which crop is impelled by the rotor. The hood has a protruding front portion 22.

In operation, rotation of the rotor 11 moves the crop engaging elements 15 so that the distal tips of the elements enter the crop with minimum disturbance of the stems of the crop, and the elements 15 then move upwardly through the crop, gathering one or more crop stems. As the elements 15 reach the upper parts of the crop, the required crop parts, for example grain, are detached from the stems. After detachment, the required crop parts are impelled upwardly and rearwardly over the rotor 11 and pass to a transverse crop feed auger 27 positioned within a collecting trough 28, for transferring crop laterally towards the center, or other discharge region, of the apparatus.

As shown in FIG. 2, the rotor 11 comprises an inner core 13 and a succession of transverse combs 31 spaced circumferentially around the rotor, the elements 15 being formed by teeth of the comb. Each tooth 15 of the comb has side edges 16 and 17 which, for each tooth, diverge from each other in a direction away from the distal tip of the tooth 15. There is provided at the junction of each adjacent pair of side edges 16 and 17 of adjacent teeth 15, an enlarged aperture 21 formed by relieved portions of adjacent teeth at the base regions thereof. In operation material including grain, grain heads, and some straw, is dislodged by the edges 20 of the apertures 21 of the teeth 15, and is impelled upwardly and rearwardly along the passage 33 to the auger 27.

The general operation of the crop stripping rotor 11 may be as set out in our prior published patent application WO 86/01972.

Referring to FIG. 1, the hood 18 has a cross section which follows a part of a circle, having its center at an axis indicated at 32. The hood 18 is supported by side members which allow pivoting of the hood 18 about the axis 32, under the control of an electric actuator or hydraulic ram 14 coupled between a side support indicated diagrammatically at 19, and part of the main mobile frame, indicated diagrammatically at 12 as already mentioned. It will be apparent that contraction and expansion of the ram 14 causes the protruding front portion 22 of the hood 18 to rise and fall, the main part of the hood 18 moving along a path which coincides with its own periphery.

It has been found that in grain stripping apparatus, front end grain losses depend upon a number of factors, but a main factor is the height of the hood inlet edge 30 relative to the crop height and profile. Variation of the height of the hood inlet edge causes changes in grain losses, and also causes the distribution of grain particles striking the underside of the hood to vary. Best results are obtained when the majority of the grain which is stripped and impelled by the rotor, strikes the underside of the hood at or approximately at the twelve o'clock position (that is to say above or approximately above the axis of rotation of the rotor), or to the rear thereof.

The invention is put into effect in this embodiment by monitoring the distribution of grain strikes along the underside of the hood 18, by means of four impact detectors indicated at 23, 24, 25 and 26, in FIGS. 1 and 3. (In some arrangements more, sometimes many more, detectors may be needed.) By analyzing signals from these detectors it is possible to derive a profile of the density of grain strikes along the underside of the hood. Signal processing apparatus (to be described hereinafter) then operates the ram 14 to vary the height of the hood portion 22 (and the angular position of the rest of the hood about the axis 32) until the main concentration of grain strikes is brought to the position which gives minimum front end losses. Usually this position has been found to be substantially directly above the axis 29 of rotation of the rotor 11, or to the rear thereof.

As the grains stripped by the stripping rotor can have a large range of velocities, it is preferable to have a grain impact detector that is unaffected by the actual velocity of the grain impacting on it. In addition to this, it is desirable to filter out the background vibrations of the machine running in the field, and the signals caused by straw and other material which is present beneath the stripper hood.

As shown in FIG. 3, the grain detectors 23, 24, 25 and 26 are inset in the underside of the hood 18, so that the lower surface of the impact detector is flush with the surrounding surface of the hood.

Figure 4A:
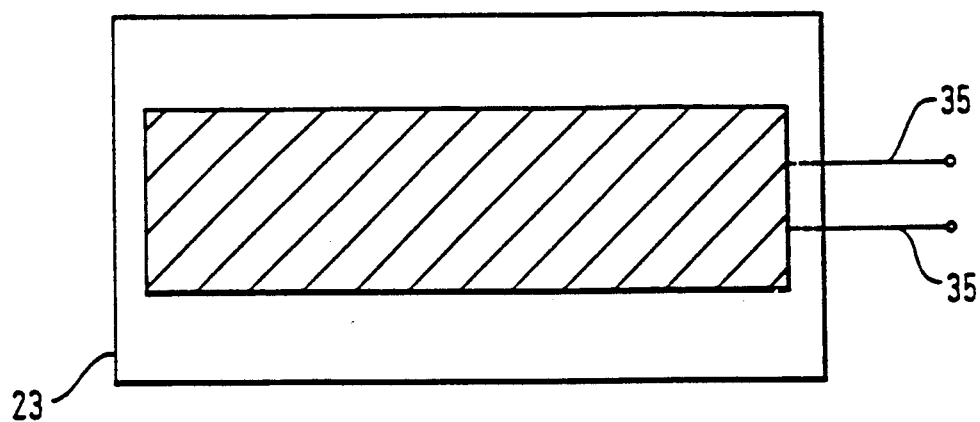
FIGS. 4a and 4b show respectively a diagrammatic plan view and a diagrammatic cross section, of an impact detector for use in the apparatus of FIG. 1.
Figure 4B:
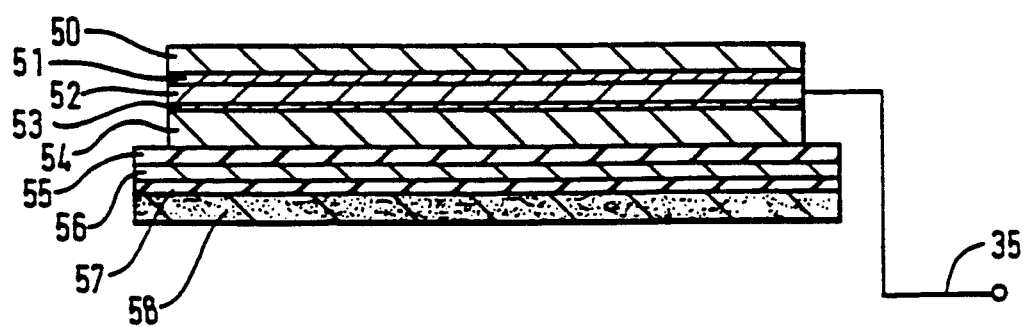

FIG. 4b shows a diagrammatic cross section through one of the impact detectors, for example the detector 23. FIG. 4a shows a plan view of the same detector 23. The detector is a commercially available silver ink (Ag-INK) piezo-electric film which detects grain impacts by producing a voltage impulse at output leads 35, for each grain strike. The impact of grain is applied, in FIG. 4b, to the upper layer of the detector. The layers comprise, taken from the impact side, a durable protective layer of PVC 50; a layer of double sided adhesive tape 51 for securing the PVC; two piezo-electric films 52 adjacent to each other; a further layer of double sided adhesive tape 53; a layer of polyurethene 54; an isolating rubber sheet 55 of 1.5 mm thickness; an 18 SWG mild steel plate 56; a further isolating rubber sheet 57; and a felt sheet 58 of 7 mm thickness. Leads 35 are attached to the piezo-electric films 52. The detectors are arranged to be waterproof and able to work in the severe conditions of the underside of the hood.

Figure 5B:
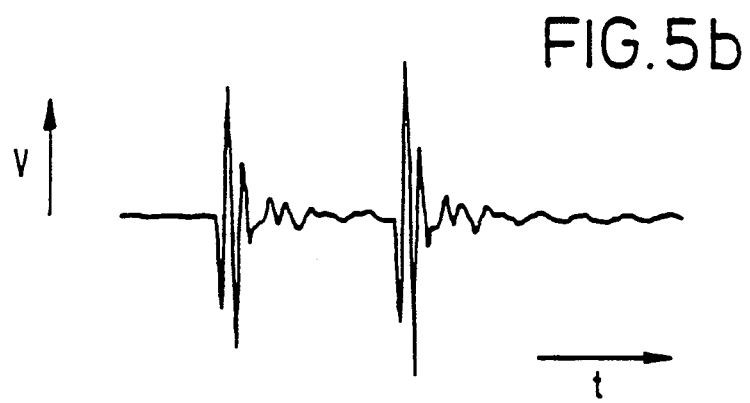

The output signal which the piezo electric films 52 would produce if undamped is shown in FIG. 5a, which shows variations of voltage v with time t. The resonance of the impact detector is such that it is impossible to count grain impacts with confidence with such a signal because of the frequency of the resonance, and the slow decay rate means that the response time of the sensing system would be much too slow. Various forms of mechanical damping, in the way of resilient material attached to the face and rear of the piezo electric film may be used, for example as shown in FIG. 4b. This results in the type of impact signal that is shown in FIG. 5b. This is a much clearer signal and the resonant frequency is reduced to give a response time of less than 4 ms.

Figure 5C:
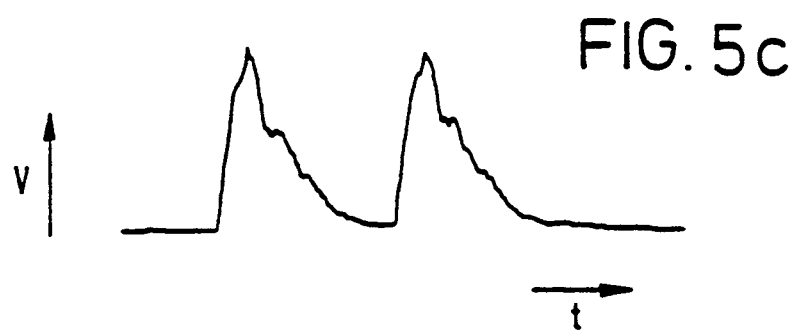
Figure 5D:

In order to count the number of grain impacts with a sufficient degree of confidence, it is necessary to increase the envelope of the cycle to a sufficient size to allow a detecting circuit to operate successfully. This may be done for example by a smoothing circuit (not shown) consisting primarily of four separate stages, namely: a high pass filter which passes frequencies of the input signal in excess of 2 kHz; an inverting operational amplifier circuit with a voltage gain of 10; a full wave rectifier circuit; and a smoothing circuit with a first order low pass filter. Such a circuit processes the signal received from the piezo electric layers in such a manner that grain impacts can be counted relatively independently of the grain velocity. The effect of such a circuit on the unprocessed signal of FIG. 5b may produce a pulsed signal as shown in FIG. 5c. With such a circuit the grain impacts can be clearly identified and the response time is within 6 ms. FIG. 5d illustrates the output signal of such a circuit when several grains are impacting on the detector, and it shows that these grains can be counted at this rate individually without confusion.

When the equipment is attached to a stripper header on a combine-harvester, extra filtration of the signal is required in order to eliminate background noise. However, this is not found to be a serious problem. With a series of grain impact detector fitted both circumferentially and transversely across the hood of the grain stripping header, an average distribution of grain impacts can be calculated within an on-board microprocessor.

FIG. 6 is a block diagram of various units for analysing and utilizing the signals from the impact detectors 23 to 26. The four detectors are indicated in FIG. 6 by a single block and the four output signals are passed to a signal smoothing unit 36, the operation of which may be generally as has been described with reference to FIGS. 5a to 5d. The smoothed outputs are fed to a counting unit 37 where the signals are digitized and counted and supplied as four sets of data representing the grain strike density at the four positions of the detectors on the hood. This output is fed to a data analyzing unit 38, in which the four counts from the counting unit 37 are converted into percentage values of the total count of grain strikes in a chosen unit of time. For example, the counting unit may be set to count the grain strikes recorded at the four detectors over a time of 0.5 to 6 seconds, and the numerical counts can then be expressed as percentages of the total count in that chosen period. The output of the unit 37 may be fed to a data comparison unit 40 for further processing, or may be fed to an operator display unit 39 in the cab of the apparatus.

It will be appreciated that the detectors 23 to 26 detect not only grain strikes, but also much background noise from general vibration of the machine. The piezo electric detectors produce a voltage pulse for each individual grain strike. Signals due to background noise are filtered out in the smoothing unit 36, which gives four analog voltage signals proportional to the number of grain strikes per unit time. These analog voltages are then digitized in the counting unit 37.

In the data comparison unit 40, the four percentage values of the counts from the counting unit 37 are compared with four standard counts representing an optimum curve for the grain strike density pattern along the hood shape. The unit 40 produces an output signal representative of the sign and magnitude of the difference between the actual density pattern and the desired optimum pattern, and this signal acts as a servo control signal and is fed to the automatic hood positioning unit 41. This unit 41 controls the position of the ram 14, and operates the ram 14 so as to adjust the position of the hood 18. As the position of the hood 18 is adjusted, the grain strike pattern recorded by the detectors 23 to 26 changes and is brought more nearly into line with the optimum pattern. The stored data with which the counts from the sensors 23 to 26 are compared in the comparator unit 40, may be obtained from previously measured laboratory and field data.

In the diagram of FIG. 6, the units 36, 37, 38 and 40 may, in this example, constitute a single signal processing means, indicated at 43, and may for example be provided by a single microprocessor. If desired a manual hood positioning unit 42 may also be provided to give manual control by the operator in response to information displayed on the screen 39 or for other reasons.

The manner in which the four percentage counts are compared with the standard counts in the comparison unit 40 may vary in sophistication depending on the signal processing effected. In a simple case, the four measured percentage counts may be used to calculated a signal representing a notional angular position along the underside of the hood at which the greatest density if grain strikes occurs. This may be a simple position of maximum density, or may be the center of distribution (which may be considered as analogous to center of gravity) of the grain strikes. This angular position may be compared with a standard angular position which is known to give minimum losses, and the output signal from the unit 40 may be a simple analog signal showing the magnitude and sense of the difference between the preferred angular position and the actual angular position.

Similarly, the display unit 39 may be arranged to indicate on a dial 60 a reading representing the angular position of the main concentration of grain strikes, and the driver may be required to adjust the hood by the manual unit 42 to keep the angular position within set limits on the dial.

There will now be described experimental results which have been obtained in analyzing the variation in density of grain strikes on the underside of a hood in a grain stripper, together with an explanation of how the variation is believed to be related to grain losses.

Figure 7A:
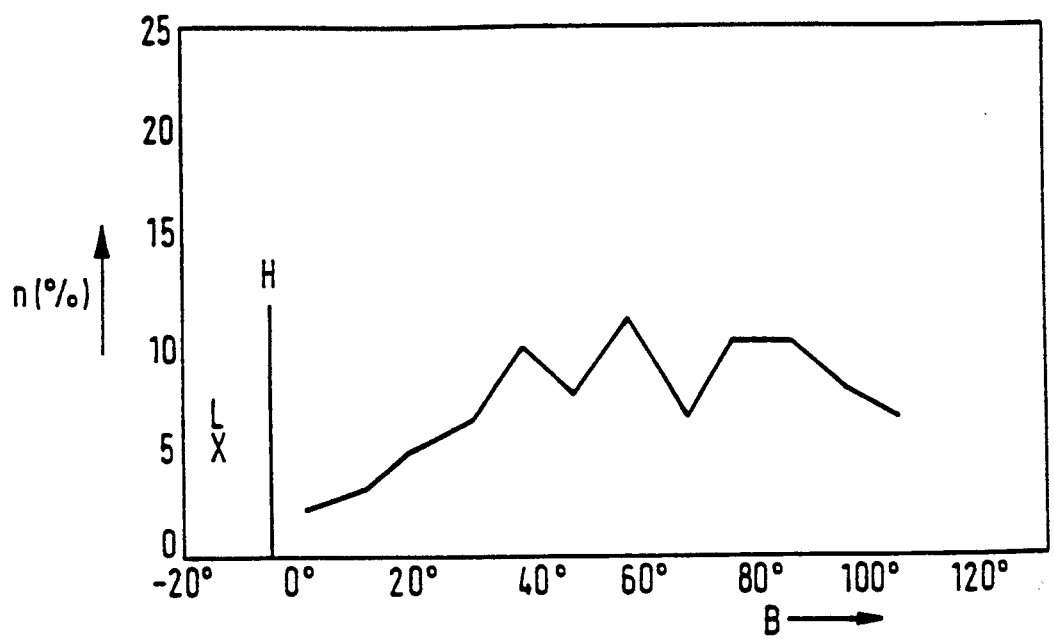

In experiments using greased surfaces beneath the hood, the numbers of grains striking at different positions were determined and plotted in graphs shown in FIGS. 7 and 8 which represent, respectively, distributions of grain strikes when the hood inlet edge was 100 mm and 200 mm below the crop height. FIG. 9 is a diagrammatic representation of a position P at which a number of grain strikes n is measured. The position P subtends an angle A at the axis 29 of the rotor, relative to the hood inlet edge 30. The position P subtends an angle B taken at the axis 32 of the rotary movement of the hood, relative to the horizontal. The graphs of FIGS. 7 and 8 show grain distribution n in percentage terms plotted against angle A around the hood taken from the axis 29 of the rotor relative to the hood inlet edge. Thus an angle of 0° equal to the point on the hood at the inlet edge 30 of the hood. The grain strikes giving the percentage figures n were obtained by counting actual grains attached to the greased undersurface of a hood. The grain loss value, shown at L, was obtained by collecting actual lost grain falling to the ground in controlled conditions. It has been found, in particular examples, that the percentage of grain impacting in the region of 100 mm above the hood inlet point, is approximately half the recorded loss level. It may be seen that the main concentration of strikes in the grain distribution around the hood, moves towards the inlet edge 30 as the inlet edge of the hood is lowered relative to the crop height (from FIG. 7 to FIG. 8), which also results in an increase in lost grains. FIG. 7 has a relatively flat distribution but it has a higher proportion of grain impacts beyond the 80° position, than FIG. 8. The minimum header loss occurred when the main concentration of the grain distribution was in the range of 85°–95° relative to the hood inlet point and therefore this would be the best setting in this particular harvesting situation. FIGS. 7a and 8a show the same results as FIGS. 7 and 8, but FIGS. 7a and 8a show the percentage count n plotted against the angle B taken relative to the horizontal line through the centre 32 of rotary movement of the hood, rather than against the angle A taken relative to the hood inlet edge as is shown in FIGS. 7 and 8.

If the grain distribution pattern around the hood is to be successfully related to header losses, then a series of sensing points around the hood are necessary (as has been described) in order to make it possible to determine the main concentration of the distribution curve. In addition to the use of the grain strike information to adjust the hood, the actual calculation of the percentage of grains impacting in the vicinity of the hood inlet may be related to the level of grain loss. If a sufficient number of grain impact detectors are attached around the hood, to define a distribution pattern similar to that shown in FIGS. 7 and 8, then it is reasonable to assume that the amount of grain lost will be approximately twice the amount of grain impacting on the hood in the region of 100 mm above the inlet point. This relationship has been established by laboratory measurements.

Grain losses at the header may be caused by several factors. Firstly, grain may be given insufficient momentum by the stripping rotor to be entrained within the main flow of material underneath the hood. This grain may be lost by simply falling downwards onto the ground without being contacted again by the stripping elements. The level of these losses is thought to be low and is not likely to be related to the distribution pattern. Secondly, the trajectory of the grain from the stripping element may be at a low angle and pass beneath the hood inlet edge. These losses should be related to the distribution pattern as recorded by the impact sensors. The third possible cause of grain loss is the diffusion of the stripped grains when they are projected by the stripping rotor. If the peak point in the distribution is near to the hood inlet point, then part of the diffusion cone may escape beneath the hood inlet and the grain will be lost. Again this loss should have a relationship with the distribution measured by the grain impact sensors.

FIGS. 10a and b, and 11a, b, c, and d, show diagrammatic representations of grain trajectories traced from high speed video film based on laboratory experimental results. Analysis of high-speed video film has been carried out in an attempt to define the trajectory of grain stripped from the crop. In addition to this, it is helpful to understand the diffusion cone of the stripped grains. In the experiments giving rise to FIGS. 10a and 11d the crop height was 500 mm, the rotor axis height above the ground was 100 mm, rotor speed was set at 700 rev/min, the clearance between the hood inlet edge and the rotor tip was 100 mm and the forward speed was 7.2 km/h.

FIGS. 10a and b show a setting for which the hood inlet edge 30 is 400 mm above the ground, and is at an optimum height for the particular harvesting situation.

FIG. 10a shows the grain trajectories from crop which has been stripped at a mid-point along the stripping element. The tip circle of the stripping rotor 11 is shown and the position of the relevant stripping elements 15. The solid lines indicate the tangent of the stripping rotor tip circle at the point of grain discharge. The broken line shows the grain trajectory and the diffusion cone is shaded. FIG. 10a shows the initial contact between the grain and a stripping element 15 identified as element AB. The grain resides on the stripping element for 10 ms before being discharged at $A_2B_2$. The diffusion cone (appearing as a two dimensional sector in the diagram) is 15° backward (relative to the rotation of the rotor) of the tangent to the tip circle at this point, as shown by the shaded area. FIG. 10b shows the effect of the same ear being stripped by a following stripping element, DE. Again the grain resides on the element for 10 ms and is discharged at position $D_2E_2$. The diffusion cone is now wider, being 10° in front of the tangent line and 20° behind it. This is because the position of the root of the straw relative to the rotor has changed, and the ear is being stripped at a slightly lower position on the stripping element circumference. Video film of grain stripping in this position confirms that the grain is well contained within the hood envelope, and losses are unlikely to occur.

FIGS. 11a to 11d show a 4-step sequence of the stripping obtained when the inlet hood edge is set too low in a standing crop. In this situation the hood height was 200 mm below the crop height. FIG. 11a shows the trajectory of grain that is stripped virtually at the tip of the stripping element 15, indicated at AB, and does not reside on the element, but is immediately projected from it. FIG. 11b shows the situation 10 ms later and shows the effect of the second stripping element DE. At this point in time the grain resides on the element for approximately 5 ms, and is projected in a diffusion cone of approximately 15° behind the tangent of the stripping circle. The third contact of a stripping element FG with the ear of grain (FIG. 11c) projects some of that grain immediately in an upward trajectory. However, as shown in FIG. 11d some of this grain which is stripped at the recess of the stripping tooth KL remains on the stripping element for 10 ms and is then projected in a 15° diffusion cone backwards from the tangent to the circle where the grain leaves the stripping element. Comparing FIGS. 11a to d with FIGS. 10a and b, it can be seen that if the hood inlet 30 is positioned too low, the angle of the trajectory of grain from the stripping rotor is much less safe. However, as the hood is in a lower position it is unlikely that grains will be lost beneath the hood inlet but are more likely to be returned from impact on the hood back into the stripping rotor and may be lost by a different route.

Thus, FIGS. 11a to 11d illustrate that if the hood is set too low, the main concentration of grain strikes tends to move forwardly towards the hood inlet edge, and it also occurs that losses increase, due to various factors including return of the grain to the rotor after striking the hood. Thus in accordance with the embodiment of the invention, the correlation between change of position of the main concentration of grain strikes and the hood being set too low is used to monitor the hood setting relative to a preferred setting. It has also been found in the same way that if the hood inlet edge is set too high, the main concentration of grain strikes also moves forwardly, and at the same time losses increase, due to various factors including forward projection of the grain under the raised hood. Again the correlation between change of position of the main concentration of grain strikes and the hood being set too high is used to monitor the hood setting relative to a preferred setting.

For example, if the hood inlet edge is only 10 mm below the crop height, i.e. 490 mm above the ground, this may be a good position of the hood for efficient stripping. However, there is always a variation in the height of the grain bearing parts of the crop and any ears that are much lower than 400 mm high, are stripped in such a position that grain is easily lost below the hood inlet edge. Thus in a practical situation such a hood height would be too high and would lead to greater losses. The best comprise situation is that shown in FIGS. 10a and b where the hood inlet edge is approximately 100 mm below the average height.

There will now be discussed the parameters which influence the basic settings of a grain stripping header and which may be controlled automatically or manually in embodiments of the invention. Ideally, stripping of the grain from the straw should be done at the 9 or 10 o'clock position on the rotor (as viewed in the drawings) and above the level of the hood inlet edge. If this is achieved, then the trajectory of the grain is upward and header losses should be low. There are five basic adjustments to the stripping header. These are:
i. rotor speed,
ii. rotor height above the ground,
iii. height of hood inlet edge above the ground and in relation to the crop height,
iv. the horizontal clearance between the hood and the rotor, and
v. the forward speed of the combine.

Some of these have a greater effect on header losses than others. When setting these, the prime objective stated above must be considered. Items i, ii and iv can be set in relation to the crop and conditions, and item v can be set relative to the separation losses of the combine. Item iii, however, must be adjusted relative to the crop height and is of particular importance. Each item will now be considered in detail.

In cereal crops the rotor speed should be between 500 and 800 rev/min for a rotor diameter of 540 mm. In the laboratory and in field work, a speed of 700 rev/min has produced the lowest losses. However, in some conditions, speeds as low as 500 rev/min can be used provided that all the grain is stripped from the straw and header losses are acceptable or cannot be reduced by using a higher rotor speed.

In well-necked barley crops and other laid crops the rotor may be set as near to the ground as possible. In standing crops of wheat, oats, rye, triticale etc., a rotor height of about 100-200 mm has given the best results depending on the crop height. The height may be judged by putting the stripping rotor axis at about 100 mm below the ear height. This allows the ears to be stripped at the 10 o'clock position on the rotor. No changes in rotor height need to be made in standing crops of even height.

The hood height should be positioned so that the ears of the crop are deflected downwards by the nose portion 22 of the hood 18 as shown in FIG. 1. After passing under the hood inlet edge 30, the horizontal clearance between the hood inlet edge 30 and the envelope of the outer tips of the rotor elements 15 should allow time for stems of the crop to recover so that heads of grain enter the stripping rotor above the height of the hood inlet edge 30. This means that stripping takes place within the enclosure of the hood 18. The position of the hood needs to be maintained at the nominal correct height relative to the ear height of the crop, and adjusted so that the ears are always deflected downwards by the nose portion 22. Header losses can increase considerably if the hood inlet edge 30 is set too low or too high in upright standing crops. In laid crop conditions with corn, the hood inlet edge 30 can be set slightly lower than the nominal crop height so that laid corn is still compressed by the inlet deflector. The same applies to badly necked barley crops.

The clearance between the hood inlet edge 30 and the envelope of the outer tips of the elements 15 needs to be set so that the crop has time to recover a little after it has been deflected downwards by the nose portion 22 of the hood. The clearance is usually set at between 100 and 135 mm from the tip of the stripping teeth. A larger clearance is preferable to a narrow clearance, but upward transfer of the crop is reduced if the clearance is more than 200 mm. The clearance can b relatively small effect on header loss levels. Header losses are reduced as the forward speed of travel is increased. Speeds of 7 km/h or faster should be maintained if the separation losses from the combine allow.

The operation of the signal processing means 43 may need to take into account further steps of analysis not illustrated in the simple block diagram of FIG. 6. Normally an optimum distribution of grain strikes occurs for a particular hood height. The relationship between the position of the maximum concentration of grain stikes and the hood height may be such that disturbance away from the optimum position by either raising and lowering of the hood will both bring the maximum density of grain stikes forward from the optimum position to a less favorable forward position. With such a configuration, a difficulty may arise in practical circumstances in the field. If the apparatus is operating at the optimum position, and a change in an external factor alters the optimum position (for example, due to a change of crop height), then it will not be clear to the control system whether the situation can be corrected by raising or by lowering the hood inlet edge.

One way of dealing with this is to move the hood inlet edge up (or down) experimentally, and then monitor whether the situation improves or not. If the maximum grain strike density moves rearwardly, then the corrective action is in the right sense and can be continued. If the maximum grain strike moves forwardly, i.e. to a worse position, then the sense of the corrective action should be reversed.

Reference will now be made to FIGS. 12, 13 and 14, which show diagrammatic representations of measured impact densities at the four detectors 23 to 26 in FIG. 1. In each Figure the graph shows the number of grain strikes measured at each impact detector, n, given as a percentage of the total count, and the angle B subtended by the relevant detector at the center 32 of rotary movement of the hood in relation to the horizontal. In FIG. 12 the line Ho represents the angular position of the hood inlet edge 30, at an optimum position. In FIG. 13, H1 represents the position of the hood inlet edge 30 when set slightly too low. In FIG. 14, the line Hh represents the position of the hood inlet edge 30 when set slightly too high. In FIGS. 13 and 14 the line Ho is shown in dotted form to provide a reference. Thus FIG. 12 represents an optimum distribution of grain density; FIG. 13 represents a distribution of grain density with the hood set too low; and FIG. 14 represents a distribution of grain density with the hood set too high. The dimensions shown in these Figures are by way of explanation, and do not represent actual measured counts and dimensions.

Referring to FIG. 12, the broken line C represents a position along the underside of the hood which is the calculated position of maximum grain strikes relative to the recorded data of the four impact detectors, and therefore indicates the position of the main concentration of grain strikes.

By way of example, the optimum angular position of main impact density Bo may be at 85° as shown in FIG. 12. The position of main concentration B1 of impact density where the hood is too low may be at 55° as shown in FIG. 13, and the angular position Bh with the hood too high may be 70° as shown in FIG. 14. Thus referring to FIG. 6, the output of the data comparison unit 40 may be arranged to be an analog signal proportional to the angle B of the main concentration of grain. When setting up the apparatus for a particular crop, the operator may set into the data comparison unit 40 that the required angle Bo should be, say, 85°. The operator starts the harvesting operation with the hood height set at an empircally judged correct position, and sets the counting unit 37 to count a sample of grain strikes over a chosen period of time, for example in the range 0.5 to 6 seconds. The data analyzing unit 38 then converts the counts into percentage form and compares the counts with predetermined counts corresponding to the optimum angle Bo. If the angle calculated by the unit 40 is not the optimum angle, the unit 40 will feed an output signal to the positioning unit 41 which will change the hood position by a discrete amount, for example equivalent to a change of height of the inlet edge 30 of 50 mm, and the count will be repeated by the counting unit 37. If the incremental change in the hood position shows an improvement, i.e. the measured angle B moves towards the optimum angle Bo, then the comparison unit 40 feeds an appropriate signal to the positioning unit 41 to continue movement of the hood by a further increment in the same direction. If, however, the previous increment worsened the situation, then the next hood movement will be in the opposite direction. This process continues until the hood position is brought within a predetermined acceptable band of angular positions about the preferred angle Bo.

Where the hood adjustment is carried out by the operator in response to observing the display unit 39, the output of the data analyzing unit 38 is fed directly to the display unit 39, which produces an analog signal driving the dial needle to show an angular reading directly related to the angle B. At the beginning of the harvesting situation, the operator will adjust the height of the hood inlet edge so that the needle lies between the marked limits shown. Thereafter, if the needle moves away from the marked limits, the driver will operate the manual hood positioning unit 42 empirically, in one sense or the other, until the needle is brought back within the marked limits.

We claim:

1. Apparatus for harvesting required crop parts from standing crop comprising:
    crop stripping means for stripping from a standing crop required parts of the crop;
    guide means cooperating with the crop stripping means to form a crop flow passage for detached crop parts;
    detector means positioned in the region of the crop flow passage for monitoring a characteristic of the trajectory of detached crop parts along the passage;
    operating means for varying an operating parameter for the apparatus which influences the trajectory of detached crop parts along the passage in operation; and
    signal processing means for processing signals from the detector means, the signal processing means having an output connected to the operating means for adjusting the operating means in response to the output of the detector means.

2. Apparatus according to claim 1 in which the detector means comprises impact detector means for detecting impacts on the guide means by detached crop parts.

3. Apparatus according to claim 2 in which the detector means comprises a series of detectors positioned along the crop flow passage to monitor the distribution of the impacts of detached crop parts along the passage.

4. Apparatus according to claim 2 in which the detector means is arranged to monitor the density of impacts of crop parts at different locations along the crop flow passage.

5. Apparatus according to claim 4 in which the signal processing means is arranged to compare a measure of the pattern of impact density along the passage with a measure of a predetermined desired pattern of impact density along the passage.

6. Apparatus according to claim 5 in which the said measure is a measure of the position along the crop flow passage of the center of distribution of impacts along the passage.

7. Apparatus according to claim 1 in which the guide means comprises a hood extending over at least part of the crop stripping means and the detector means comprises impact detector means for detecting impacts by detached crop parts on the underside of the hood.

8. Apparatus according to claim 7 in which the operating means comprises means for moving the hood relative to the crop stripping means.

9. Apparatus according to claim 7 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop, in which the crop stripping means includes a rotor mounted for rotation about a substantially horizontal axis transverse to the direction of forward travel of the apparatus, the rotor being driven in operation in a sense such that at the bottom of the rotor, the periphery of the rotor moves in the same direction as the forward travel of the apparatus, and in which the operating means is arranged to pivot the hood about an axis parallel to and spaced from the axis of the rotor, so as to move the edge of the hood at the inlet to the crop flow passage downwardly and towards the outer envelope of the tips of the elements or upwardly and away from the outer envelope of the tips of the rotor.

10. Apparatus according to claim 1 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop.

11. Apparatus according to claim 1 in which the crop stripping means includes a rotor mounted for rotation about a substantially horizontal axis transverse to the direction of forward travel of the apparatus, the rotor being driven in operation in a sense such that at the bottom of the rotor, the periphery of the rotor moves in the same direction as the forward travel of the apparatus.

12. Apparatus according to claim 1 in which the signal processing means is arranged to compare data derived from the detector means with stored data representing a desired characteristic of the trajectory of detached crop parts along the passage.

13. Apparatus according to claim 12 in which the guide means comprises a hood extending over at least part of the crop stripping means and the detector means comprises impact detector means for detecting impacts by detached crop parts on the underside of the hood and in which the said desired characteristic is that the main concentration of impacts by detached crop parts occurs on the underside of the hood at a predetermined region.

14. Apparatus according to claim 12 in which the signal processing means is arranged to generate an output signal representing the difference between the monitored characteristic of the crop trajectory in the passage and the desired characteristic.

15. Apparatus according to claim 14 in which the output signal of the signal processing means is applied to effect adjustment of the operating means so as to bring the characteristic of the crop movement in the passage into closer correspondence with the said desired characteristic.

16. Apparatus according to claim 15 in which the guide means comprises a hood extending over at least part of the crop stripping means and the detector means comprises impact detector means for detecting impacts by detached crop parts on the underside of the hood and in which the operating means is arranged to change a height of the front of the hood in response to the said output signal.

17. Apparatus according to claim 16 in which the operating means is arranged to change a height of the front of the hood in response to detection of an increase in the proportion of impacts on the hood in the region of the inlet to the crop flow passage.

18. Apparatus according to claim 12 in which the guide means comprises a hood extending over at least part of the crop stripping means and the detector means comprises impact detector means for detecting impacts by detached crop parts on the underside of the hood and in which the said desired characteristic is that the main concentration of impacts by detached crop parts occurs on the underside of the hood at a predetermined region.

19. Apparatus according to claim 12 in which the signal processing means is arranged to generate an output signal representing the difference between the monitored characteristic of the crop trajectory in the passage and the desired characteristic.

20. Apparatus according to claim 1 in which the operating means comprises means for varying the shape and/or dimensions of the crop flow passage.

21. Apparatus according to claim 1 in which the crop stripping means includes a rotor mounted for rotation about a substantially horizontal axis transverse to the direction of forward travel of the apparatus, the rotor being driven in operation in a sense such that at the bottom of the rotor, the periphery of the rotor moves in the same direction as the forward travel of the apparatus.

22. Apparatus for harvesting required crop parts from standing crop comprising:
    crop stripping means for stripping from a standing crop required parts of the crop;
    guide means cooperating with the crop stripping means to form a crop flow passage for detached crop parts;
    detector means positioned in the region of the crop flow passage for monitoring a characteristic of the trajectory of detached crop parts along the passage;
    operating means for varying an operating parameter for the apparatus which influences the trajectory of detached crop parts along the passage in operation; and
    signal processing means for processing signals from the detector means, the signal processing means having an output connected to a display means for displaying to an operator an indication of the said characteristic monitored by the detector means.

23. Apparatus as claimed in claim 22 in which the detector means comprises impact detector means for detecting impacts on the guide means by detached crop parts.

24. Apparatus as claimed in claim 23 in which the detector means comprises a series of detectors positioned along the crop flow passage to monitor the distribution of the impacts of detached crop parts along said passage.

25. Apparatus according to claim 23 in which the detector means is arranged to monitor the density of impacts of crop parts at different locations along the crop flow passage.

26. Apparatus according to claim 25 in which the signal processing means is arranged to compare a measure of the pattern of impact density along the passage with a measure of a predetermined desired pattern of impact density along the passage.

27. Apparatus according to claim 24 in which the said measure is a measure of the position along the crop flow passage of the center of distribution of impacts along the passage.

28. Apparatus according to claim 22 in which the guide means comprises a hood extending over at least part of the crop stripping means and the detector means comprises impact detector means for detecting impacts by detached crop parts on the underside of the hood.

29. Apparatus according to claim 28 in which the operating means comprises means for moving the hood relative to the crop stripping means.

30. Apparatus according to claim 28 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop, in which the crop stripping means includes a rotor mounted for rotation about a substantially horizontal axis transverse to the direction of forward travel of the apparatus, the rotor being driven in operation in a sense such that at the bottom of the rotor, the periphery of the rotor moves in the same direction as the forward travel of the apparatus, and in which the operating means is arranged to pivot the hood about an axis parallel to and spaced from the axis of the rotor, so as to move the edge of the hood at the inlet to the crop flow passage downwardly and towards the outer envelope of the tips of the elements or upwardly and away from the outer envelope of the tips of the rotor.

31. Apparatus according to claim 22 in which the crop stripping means comprises a plurality of outwardly projecting crop stripping elements mounted on a moveable support means, and drive means for driving the moveable support means so as to move the crop stripping elements along a path which includes movement upwardly and rearwardly as the apparatus moves forwardly into the crop.

32. Apparatus according to claim 22 in which the signal processing means is arranged to compare data derived from the detector means with stored data representing a desired characteristic of the trajectory of detached crop parts along the passage.

33. Apparatus according to claim 22 in which the operating means comprises means for varying the shape and/or dimensions of the crop flow passage.

* * * * *